United States Patent [19]

Kohler et al.

[11] 4,113,925
[45] Sep. 12, 1978

[54] BATTERY FILLING AND VENTING STRUCTURE

[75] Inventors: Werner Köhler, Stuttgart; Gerhard Drücker, Neuhausen; Ulrich Kiess, Esslingen-Liebersbronn; Manfred Stotz, Sersheim, all of Germany

[73] Assignee: Daimler-Benz Aktiengesellschaft, Germany

[21] Appl. No.: 717,682

[22] Filed: Aug. 25, 1976

[30] Foreign Application Priority Data

Aug. 26, 1975 [DE] Fed. Rep. of Germany ....... 2537848

[51] Int. Cl.² ............................................ H01M 2/12
[52] U.S. Cl. ........................................ 429/78; 429/89
[58] Field of Search ................... 429/63, 77, 78, 89, 429/72

[56] References Cited
U.S. PATENT DOCUMENTS

| | | | |
|---|---|---|---|
| 1,244,909 | 10/1917 | Skinner | 429/78 |
| 2,346,937 | 4/1944 | Olson | 429/78 |
| 2,457,322 | 12/1948 | Sandusky | 429/78 |
| 2,516,084 | 7/1950 | Wells | 429/72 |
| 2,930,831 | 3/1960 | Hemig | 429/63 |
| 3,385,467 | 5/1968 | Lindenberg | 429/89 |
| 3,708,348 | 1/1973 | Painter | 429/78 |

Primary Examiner—Donald L. Walton
Attorney, Agent, or Firm—Craig & Antonelli

[57] ABSTRACT

A battery with at least one filler connection for electrolyte liquid, in which the battery interior space is adapted to be connected with the atmosphere by way of at least one venting connection and the opening of the venting connection which terminates in the battery interior space is located geodetically approximately at the height of the intended liquid level; a fill-in chamber is interconnected between the opening of the filler connection which terminates in the atmosphere, and the battery interior space while the fill-in chamber is connected with the battery interior space by means of a chamber connection whose opening terminating in the battery interior space is located geodetically above the intended liquid level; the free cross section of the chamber connection is dimensioned so small that a liquid seal closing off the chamber connection in a gas-tight manner will form under the influence of the excess pressure which will establish itself in the battery interior space above the liquid level during the fill-in operation once the liquid has entered into the opening of the venting connection which terminates in the battery interior space.

25 Claims, 3 Drawing Figures

BATTERY FILLING AND VENTING STRUCTURE

The present invention relates to a battery with at least one filler connection for electrolyte fluid. With multi-cell batteries, as are used in particular for the electric power supply in motor vehicles, each battery cell is customarily provided with its own filler connection since the cell represents an essentially closed-off liquid chamber.

During the re-fill with distilled water, difficulties are oftentimes encountered in not exceeding the intended liquid level in the battery interior space. If the intended liquid level is exceeded, this represents a reduction of the gasing space in the battery interior space above the liquid level, which space is required for the collection of the gas/electrolyte mixture that forms during the operation and especially during the charging of the battery. As a result of this reduction of the gasing space, the gas can no longer separate from the electrolyte; an excess pressure of the gas/electrolyte mixture results, by means of which electrolyte liquid is forced to the outside by way of the venting opening terminating in the atmosphere which is customarily provided in the threaded closure member of the filler connection. By reason of the chemical aggressiveness of the electrolyte liquid with respect to numerous materials, one therefore aims at avoiding the discharge or ejection of electrolyte liquid. It is known for that purpose to provide a mark for the intended liquid level in the filler connection and/or externally at the translucent battery housing. However, such a mark can be frequently viewed or seen from the outside only with difficulty, and is additionally disadvantageous because the accurate filling up to this mark continues to be left to the care of the servicing personnel.

The present invention is concerned with the task to enable an accurate maintenance of the intended liquid level during the refilling of distilled water independently of the arbitrariness of or lack of care on the part of the servicing personnel.

The underlying problems are solved in an advantageous manner according to the present invention in that the battery interior space is adapted to be connected with the atmosphere by at least one filler venting connection and the opening of the filler venting connection terminating in the battery interior space, is located geodetically substantially at the height of the intended liquid level, and in that a fill-in chamber is connected between the opening of the filler connection terminating in the atmosphere and the interior space of the battery and the fill-in chamber is connected with the battery interior space by means of a chamber connection whose discharge orifice located in the interior space of the battery is arranged geodetically above the intended liquid level, and in that the free-flow cross-section of the chamber connection is dimensioned so narrow that a liquid seal which closes off the chamber connection in a gas-tight manner, forms under the influence of the excess pressure, which establishes itself during the filling operation in the battery interior space above the liquid level when the liquid has entered into the opening of the filler venting connection terminating in the battery interior space.

In the battery according to the present invention, an "over-filling" is necessarily precluded because the gasing space is automatically closed off gas-tight with respect to the atmosphere when reaching the intended liquid level. This takes place in that the liquid column in the battery interior space seals off the venting connection serving to assure the intended liquid level and the liquid seal in the chamber connection terminating in the battery interior space closes off the fill-in chamber, whereby the two possible paths for the escape of the air out of the gasing space are blocked off.

If the filler connection is closed off by the customary threaded closure device having a venting opening, there exists the danger that electrolyte liquid is discharged or ejected out of the filler connection or out of the fill-in chamber by way of the venting opening under the effect of the interior pressure within the gasing space. This danger is particularly great during the charging operation because in that case an increased gas formation occurs. In order to avoid the discharge or ejection of electrolyte liquid by reason of its chemical aggressiveness, it is proposed that the fill-in chamber is provided with a pressure equalization opening adapted to be closed off, which terminates in the battery interior space at a place geodetically above the intended liquid level and that the threaded closure member is provided with a venting opening in open communication with the atmosphere, and in that in the closing position of the threaded closure member, the pressure equalization opening is both positively opened as also connected by way of a short connecting pipe with a venting opening. The pressure equalization opening must be so constructed that it is closed if the intended liquid level is reached during the refilling of distilled water and therewith the chamber connection of the filling chamber is to be closed off gas-tight.

If one makes in the battery according to the present invention the arrangement in such a manner that the filler venting connection is located outside of the filler connection and of the fill-in chamber, then the available fill-in cross section of the filler connection remains preserved. This is of advantage because the liquid is able to flow off rapidly during the filling operation and as a result thereof the liquid level in the battery interior space can be easily recognized.

It is favorable to arrange the filler venting connection so near the filler connection that the opening of the filler venting connection terminating in the atmosphere is adapted to be closed off by the threaded closure member of the filler connection. A separate closure device for the filler venting connection can be dispensed with in this manner.

In order to avoid an unintentional introduction of liquid into the battery interior space during the filling operation by way of the filler venting connection adjacent the filler connection, it is appropriate that means are provided which prevent the entry of liquid from the outside into the opening of the venting connection terminating in the atmosphere. In a structurally simple realization of these means, a capillary constriction of the opening of the filler venting connection terminating in the atmosphere may be provided.

In the battery according to the present invention, the pressure equalization opening of the fill-in chamber may be adapted to be closed off, for example, by a check valve which so cooperates with the threaded closure device of the filler connection that the pressure equalization opening is necessarily opened up in the closing position of the threaded closure means—whereas it is closed off as the rest. For purposes of avoiding separate valve means for closing off the pressure equalization opening, it is proposed according to the present invention that the free flow cross section of the pressure equalization opening of the fill-in chamber is so narrowly dimensioned that a liquid seal closing off the pressure equalization opening in a gas-tight manner will form under the influence of the capillary effect and of the excess pressure, which establishes itself during the filling operation within the battery interior space above the liquid level, when the liquid has entered into the opening of the filler venting connection terminating in the battery interior space. In this manner, the pressure equalization opening is during the filling operation a part of the chamber connection which connects the fill-in chamber with the battery interior space so that also the available fill-in cross section is not reduced.

For purposes of forming a liquid seal, the chamber connection may be provided, for example, with a U-shaped pipe having leg pipe portions of unequal length, of which the shorter leg pipe portion terminates in the battery interior space and the longer leg pipe portion is formed by the fill-in chamber itself or terminates in the same.

Another embodiment of the battery according to the present invention which is advantageous in particular as regards a simple structural configuration and easy manufacturing ability resides in that the chamber connection between the fill-in chamber and the battery interior space is formed by at least one opening in a wall of the fill-in chamber and the free-flow cross section of the opening is dimensioned so narrowly that a liquid seal closing off the opening in a gas-tight manner, forms under the influence of the capillary effect and of the excess pressure which will establish itself during the filling operation in the battery interior space above the liquid level, when the liquid has entered into the opening of the filler venting connection terminating in the battery interior space.

The openings may be arranged, as such, in the preferably cylindrical side wall of the fill-in chamber. Appropriately, however, the opening forming the chamber connection are provided in a bottom part of the fill-in chamber preferably made in one piece with the chamber wall.

In an advantageous further development of the battery according to the present invention, it is proposed that the fill-in chamber includes a control opening for the introduction of a liquid siphon, which control opening is adapted to be elastically enlarged in its free cross section and which will, therefore, return to its non-enlarged cross section and that the non-enlarged cross section of the control opening is dimensioned so small that a liquid seal closing off the control opening in a gas-tight manner will form under the influence of the capillary action and the excess pressure which will establish itself during the filling operation in the battery interior space above the liquid level when the liquid has entered the opening of the filler venting connection terminating in the battery interior space. During the refilling of distilled water, the control opening simultaneously operates as chamber connection for the formation of a liquid seal in order to assure the intended liquid level.

It is particularly advantageous if an elastic bottom part of the fill-in chamber is provided with the control opening. As a result of the elasticity of the bottom part, such an opening is already, as such, adapted to be elastically enlarged in its free cross section in a manner automatically returning to its non-enlarged cross section.

A good capillary effect is achieved with the control opening in that the same is constructed slot-shaped.

In order to achieve a large fill-in cross section in a small space by the use of a pressure equalization- and control opening operating respectively as chamber connection, it is advantageous that the control opening is star-shaped and the pressure equalization opening is located in the center of the control opening. In that case, the wall sectors located between the slot sections mutually arranged star-shaped operate as bending-elastic spring tongues which are elastically returningly spread apart during the insertion of a liquid siphon into the center opening area of the star slot.

It is known in connection with batteries that the threaded closure member includes a labyrinth chamber operating as liquid separator and battery venting means, whose interior space is connected with the atmosphere by way of a venting opening and with the interior space of the filler connection by means of a standpipe or vertical pipe. In application of the invention to such batteries, the arrangement may be so made in a simple and advantageous manner that a tubularly shaped short connecting pipe arranged both coaxial as well as immovable with respect to the standpipe connects a pressure equalization opening provided in the bottom part of the fill-in chamber with the interior space of the labyrinth chamber.

Accordingly, it is an object of the present invention to provide a battery which avoids by simple means the aforementioned shortcomings and drawbacks encountered in the prior art.

Another object of the present invention resides in a battery which eliminates difficulties heretofore encountered in not exceeding the intended liquid level in the battery space during the refill operation of the battery with distilled water.

A further object of the present invention resides in a battery in which the danger of discharge of electrolyte is greatly diminished.

Still a further object of the present invention resides in a battery in which the gas will always be able to separate from the electrolyte to prevent the formation of excess pressure causing undesired discharge of electrolyte liquid.

Still another object of the present invention resides in a battery in which the accurate refilling of the battery up to a predetermined level is not dependent on the care of the servicing personnel.

Another object of the present invention resides in a battery of the type described above in which an overfilling is made practically impossible.

A further object of the present invention resides in a battery of the type described above which fulfills all the intended purposes by extremely simple means, entailing relatively low cost in manufacture.

These and other objects, features and advantages of the present invention will become more apparent from the following description when taken in connection with the accompanying drawing which shows, for purposes of illustration only, one embodiment in accordance with the present invention, and wherein.

Figure 1:
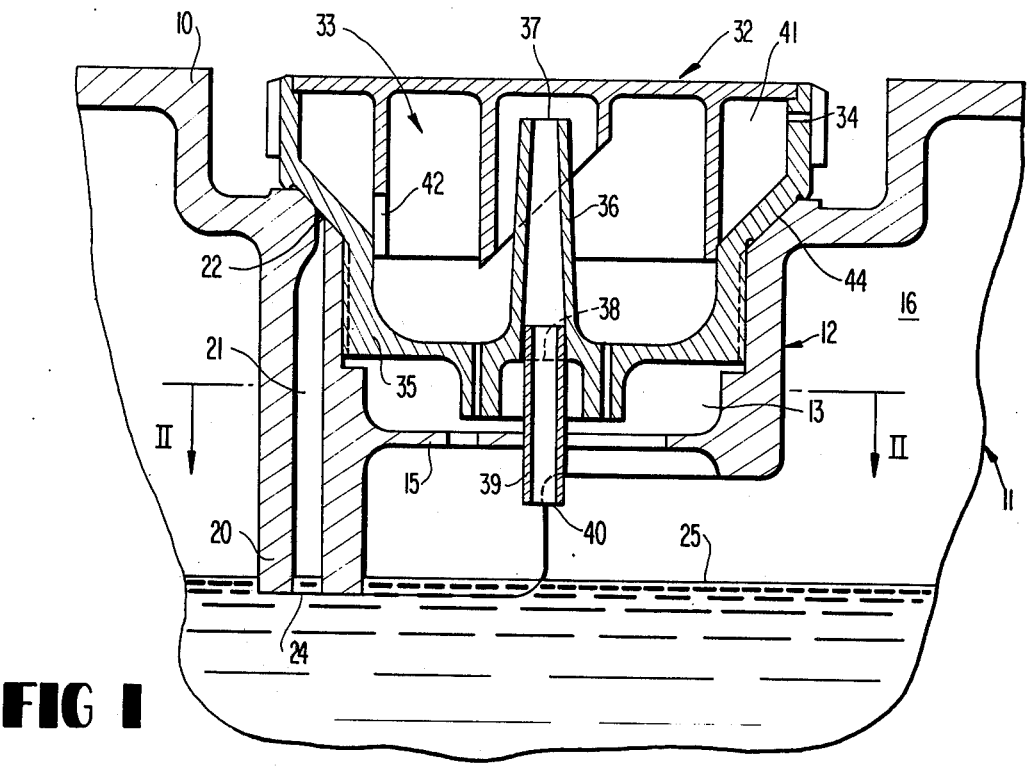
FIG. 1 is a partial vertical cross-sectional view taken along line I—I of FIG. 2, through a starter battery according to the present invention of a motor vehicle, on an enlarged scale, the cross-sectional plane containing the axis of a filler connection of a battery cell closed by a threaded closure member.
Figure 2:
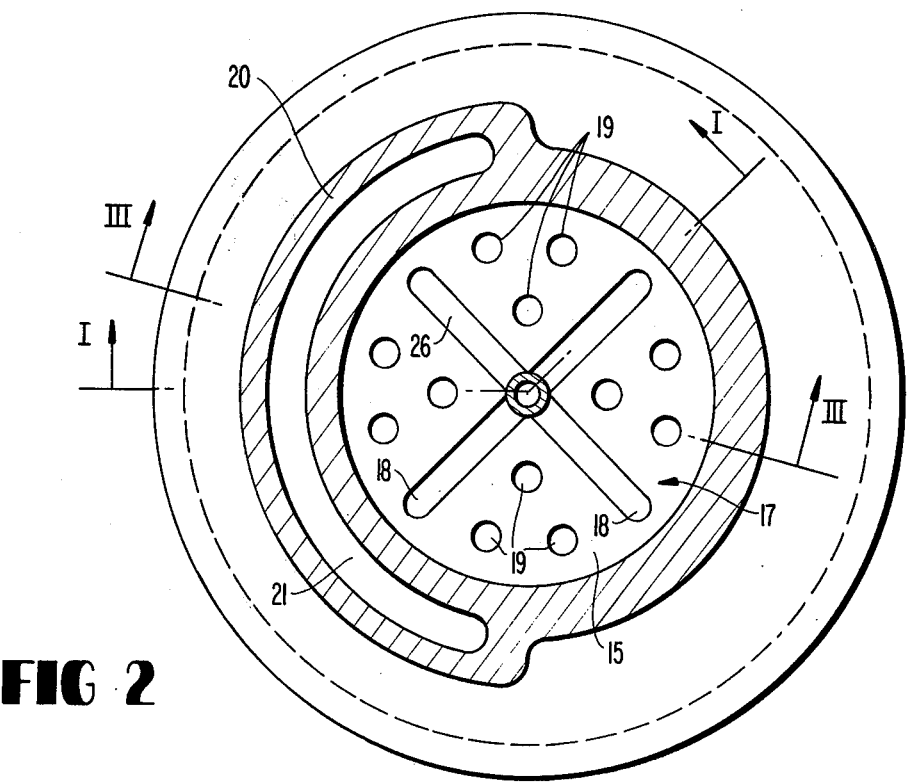
FIG. 2 is a partial horizontal cross-sectional view of the starter battery of FIG. 1 taken along line II—II of FIG. 1.
Figure 3:
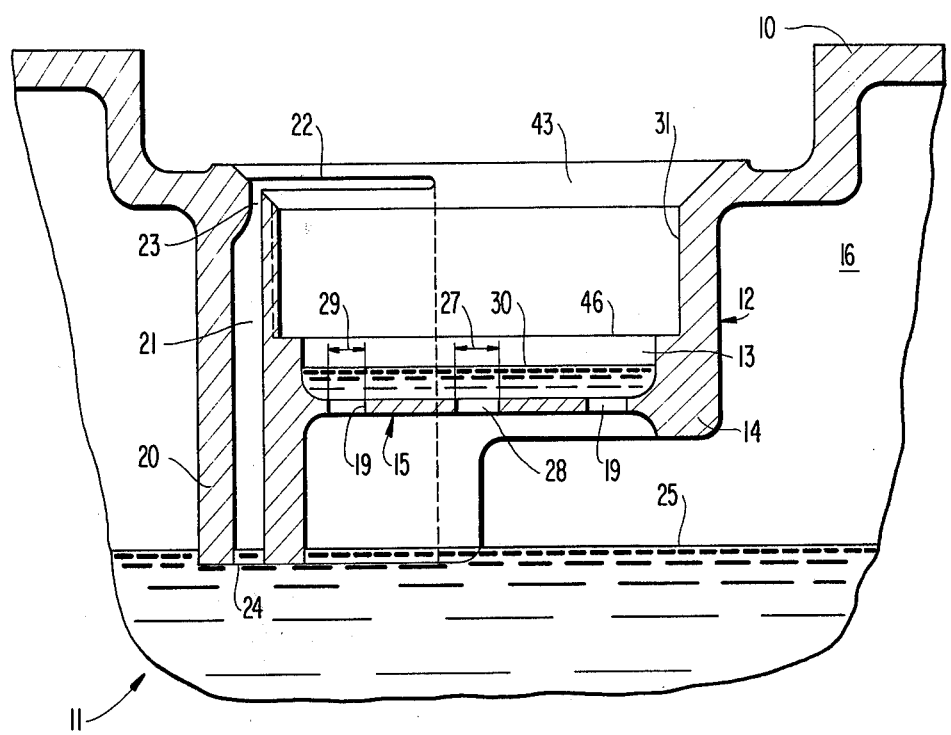
FIG. 3 is a partial vertical cross-sectional view, similar to FIG. 1, through the starter battery of the present invention, however, without threaded closure member.

Referring now to the drawing wherein like reference numerals are used throughout the various views to designate like parts, only those details necessary for an understanding of the present invention are illustrated in the drawing of the starter battery shown therein. Referring now to FIG. 1 and especially to FIG. 3, a filler connection generally designated by reference numeral 12 is provided recessed in the ceiling or top wall 10 of the battery generally designated by reference numeral 11, by way of which a battery cell (not shown in detail) is filled with electrolyte liquid and distilled water. The interior space of the filler connection 12 respresents a fill-in chamber 13 which is partitioned off with respect to the gasing space 16 by a bottom 15 formed in one piece with the cylindrical wall 14 of the filler connection 12. The gasing space 16 is located in the battery interior space underneath the top wall 10. The bottom 15 is provided with a star-shaped control opening generally designated by reference numeral 17 (FIG. 2) arranged coaxial to the axis of the filler connection 12 as well as with further openings 19 arranged between the slot arms 18. A filler venting channel 21 (FIGS. 1 and 3) extends in a reinforced wall section 20 of the cylindrical wall 14 parallel to the axis of the filler connection 12. The discharge orifice 22 of the filler venting channel 21 on the side of the atmosphere is located at a capillary restriction 23. The lower opening 24 of the filler venting channel 21 which terminates in the battery interior space is arranged geodetically slightly lower than the intended liquid level of the battery cell indicated at 25. If liquid is filled into the battery interior space by way of the opening 46 of the fill-in chamber 13 on the side of the atmosphere, then air escapes out of the battery interior space for such length of time until the liquid has entered into the lower opening 24 and the filler venting channel 21 is closed off thereby with respect to the gasing space 16 above the liquid level. During a further filling of the battery interior space, air or gas could still escape, as such out of the gasing space 16 into the atmosphere only by way of the openings 17 and 19 in the bottom 15 of the fill-in chamber 13. Since the openings 17 and 19 are located geodetically at one and the same height and the bottom 15 is constructed flat, liquid flows through all openings during the filling operation. The widths 26 (FIG. 2) of the slot arms 18, the diameter 27 (FIG. 3) of the center area 28 of the slot opening 17 as well as the diameter 29 (FIG. 3) of the openings 19, however, are so narrowly dimensioned in adaptation to the physical properties of the liquid and of the material of the bottom 15 that a capillary effect will start in the openings 17 and 19 under the influence of the excess pressure building up in the gasing space 16 during the further pouring in of liquid and as a result thereof, a liquid seal indicated at 30 (FIG. 3) will build up in and above the openings 17 and 19 which blocks the escape of air or of gases out of the gasing space 16. As a result thereof, no liquid can any longer enter into the battery interior space, also if liquid continues to be filled in into the filler connection 12. Consequently, an unintentional overfilling of the battery is not possible. The capillary constriction 23 thereby prevents the entry of liquid into the battery interior space by way of the upper opening 22 of the filler venting channel 21.

The filler connection 12 is provided above the fill-in chamber 13 with a threaded socket 31 for a threaded closure member generally designated by reference numeral 32 by means of which the opening 46 of the fill-in chamber 13 is adapted to be closed (FIG. 1). The threaded closure member 32 which is constructed hollow is provided with an internal labyrinth chamber 33 which is in communication with the atmosphere by way of a venting opening 34. The entry of the labyrinth chamber 33 on the battery side is formed by a standpipe or vertical pipe 36 arranged centrally in the floor 35 of the labyrinth chamber 33, whose upper opening 37 terminates in the labyrinth chamber 33. A short connecting pipe 39 extending through the fill-in chamber 13 is securely inserted into and held in the lower opening 38 of the standpipe 36, whose lower opening 40 is located geodetically above the intended liquid level 25 and therefore connects the upper opening 37 of the standpipe 36 with the gasing space 16. An annular space 41 of the labyrinth chamber 33 is effectively connected between the upper opening 37 and the venting opening 34, into which air or gas is able to enter from the opening 37 by way of an inlet opening 42. If one starts with the fact that this inlet opening 42 is continuously open for the passage of air or gas—then the connecting member 39 necessarily establishes a pressure equalization between the atmosphere and the gasing space 16. This pressure equalization eliminates the liquid seal 30 in the fill-in chamber 13 which has remained after the fill-in or refill operation, i.e., this liquid quantity flows off into the battery interior space. The short connecting pipe 39 extends through the center area 28 of the control opening 17. As a result thereof, the area 28 represents a pressure equalization opening in the bottom 15 of the fill-in chamber 13 which during refilling with distilled water forms a liquid seal when reaching the intended liquid level 25.

The control opening 17 is constructed so as to be elastically enlargeable in its free cross section in order to enable the introduction of a liquid siphon for the control of the acid content of the electrolyte liquid and to cause the control opening 17 to return to its non-enlarged cross section upon removal of the siphon. It would suffice, as such, for this purpose, if the control opening 17 enclosing the pressure equalization opening 28 would form a simple, rectilinearly extending slot in the bottom 15. This, however, requires a relatively high elasticity for the material of the bottom 15. In order to be able to make the bottom 15 in one piece with the remaining battery housing which customarily consists of a synthetic plastic material having relatively low elasticity, the slot containing the pressure equalization opening 28 is constructed star-shaped. Bending elastic bottom sectors which are adapted to be spread apart as springy tongues by the liquid siphon will result in this manner between the slot arms 18 which, notwithstanding the relatively slight elasticity of their material, will impart to the control opening 17 the desired property of the ability to be elastically enlarged and to return again to its non-enlarged opening cross section. The control opening 17 therefore has three functions. During refilling with distilled water, it serves together with the other openings in the bottom 15 as fill-in opening, in which upon reaching the intended liquid level 25, a capillary effect occurs, as a result of which a liquid seal will form which closes off the gasing space 16 with respect to the atmosphere. If the filler connection 12 is closed off by the threaded closure member 32, the pressure equalization opening in the center of the control opening 17 provides in cooperation with the connecting pipe 39 and the venting opening 34, a pressure equalization between the gas space 16 and the atmosphere. Finally, the control opening 17 serves for the introduction of the liquid siphon.

The opening 22 of the filler venting channel 21 on the side of the atmosphere terminates in a conical seating surface 43 (FIG. 3) of the filler connection 12 which adjoins the threaded socket 31. The threaded closure member 32 is provided with a corresponding conical sealing surface 44 (FIG. 1) which closes off the opening 22 with respect to the atmosphere when the closure member 32 is in its closure position as shown in FIG. 1.

While we have shown and described only one embodiment in accordance with the present invention, it is understood that the same is not limited thereto but is susceptible of numerous changes and moidifications as known to those skilled in the art, and we therefore do not wish to be limited to the details shown and described herein but intend to cover all such changes and modifications as are encompassed by the scope of the appended claims.

We claim:

1. A battery comprising at least one cell defining a battery interior space and at least one filler means having an opening terminating in the atmosphere for introducing electrolyte liquid into said interior space, the battery interior space being connected with the atmosphere by way of at least one filler venting connecting means having an opening terminating in the atmosphere and an opening terminating in the battery interior space which is geodetically located approximately at the height of the intended liquid level within said battery interior space, a fill-in chamber means located between the opening of said filler means terminating in the atmosphere and the interior space of the battery, and chamber connecting means connecting the fill-in chamber means with the battery interior space, said chamber connecting means including at least one opening of a narrow capillary free flow cross section terminating in the battery interior space and geodetically arranged above the intended liquid level, the free flow cross section of the at least one opening being such that a liquid said means closing off the at least one opening in a substantially gas tight manner will form under the influence of a capillary effect and the excess pressure which will establish itself during a fill-in operation in the battery interior space above the liquid level, when the liquid has entered into the opening of the venting connecting means terminating in the battery interior space, a detachable closure means for closing off the opening of the filler means terminating in the atmosphere, the fill-in chamber means being provided with a pressure equalization opening that terminates in the battery interior space at a place geodetically above the intended liquid level, and the closure means being provided with a vent opening in continuous communication with the atmosphere, the pressure equalization opening being connected with the vent opening by a venting connection means when the closure means is in the closed position and said filler venting connecting means being positioned outside of the filler means and outside of the fill-in chamber means.

2. A battery according to claim 1, wherein the filler venting connecting means includes a venting channel and the battery interior space includes a gasing space.

3. A battery according to claim 1, wherein the opening of the venting connecting means terminating in the atmosphere is closed off by the closure means in the closed position.

4. A battery according to claim 3, wherein further means are provided which prevent the entry of liquid from the outside into the opening of the venting connecting means terminating in the atmosphere.

5. A battery according to claim 4, wherein the further means are in the form of a capillary constriction.

6. A battery according to claim 4 wherein the free flow cross section of the pressure equalization opening of the fill-in chamber means is so narrowly dimensioned that a liquid seal closing off the pressure equalization opening gas tight will form under the influence of the capillary effect and of the excess pressure which will establish itself during the fill-in operation in the battery interior space above the liquid level, when the liquid has entered the opening of the venting connecting means terminating in the battery interior space.

7. A battery according to claim 6, wherein the chamber connecting means between the fill-in chamber means and the battery interior space includes the at least one opening located in a wall means of the fill-in chamber means and the free flow cross section of said at least one opening is so narrowly dimensioned that a liquid seal closing off said at least one opening gas-tight will form under the influence of the capillary effect and of the excess pressure which will establish itself during the fill-in operation in the interior space of the battery above the liquid level, when the liquid has entered the opening of the venting connecting means terminating in the battery interior space.

8. A battery according to claim 7, wherein said last-mentioned at least one opening provided in said wall means is provided in a bottom part of the fill-in chamber means.

9. A battery according to claim 1, wherein the fill-in chamber means is provided with a elastic bottom wall portion defining a control opening for the insertion of a liquid siphon that will elastically enlarge the free cross section of said control opening, and the non-enlarged cross-section of the control opening upon removal of the liquid siphon being so dimensioned and the free-flow cross section of said at least one opening of said chamber connecting means being so dimensioned that a liquid seal means closing off said openings gas-tight will form under the influence of a capillary effect and the excess pressure which will establish itself during the fill-in operation in the battery interior space above the liquid level, when the liquid has entered into the opening of the venting connecting means terminating in the battery interior space.

10. A battery according to claim 9, wherein the control opening is slot-shaped.

11. A battery according to claim 10, wherein the control opening is star-shaped and the pressure equalization opening is located in the center of the control opening.

12. A battery according to claim 11, wherein the closure means includes a labyrinth chamber means operating as liquid separator and battery venting means, which includes a vent opening terminating in the atmosphere and a standpipe connecting the interior space of the labyrinth chamber means and the fill-in chamber means, a tubularly shaped connecting member arranged coaxially immovably to the standpipe connects a gasing space in the battery interior space with the interior space of the labyrinth chamber means.

13. A battery according to claim 9, wherein said elastic bottom wall portion defining a control opening is integral with the rest of the fill-in chamber means.

14. A battery according to claim 1, wherein the free flow cross section of the pressure equalization opening of the fill-in chamber means is so narrowly dimensioned that a liquid seal closing off the pressure equalization opening gas-tight will form under the influence of the capillary effect and of the excess pressure which will establish itself during the fill-in operation in the battery interior space above the liquid level, when the liquid has entered the opening of the venting connecting means terminating in the battery interior space.

15. A battery according to claim 1, wherein the chamber connecting means between the fill-in chamber means and the battery interior space includes the at least one opening located in a wall means of the fill-in chamber means and the free flow cross section of said at least one opening is so narrowly dimensioned that a liquid seal closing off said at least one opening gas-tight will form under the influence of the capillary effect and of the excess pressure which will establish itself during the fill-in operation in the interior space of the battery above the liquid level, when the liquid has entered the opening of the venting connection means terminating in the battery interior space.

16. A battery according to claim 15, wherein said last-mentioned at least one opening provided in said wall means is provided in a bottom part of the fill-in chamber means.

17. A battery according to claim 1, wherein the fill-in chamber means has an elastic bottom portion defining a control opening for the insertion of a liquid siphon that will elastically enlarge the free cross section of the control opening.

18. A battery according to claim 17, wherein said elastic bottom portion is integral with the rest of the fill-in chamber means.

19. A battery comprising at least one cell defining an interior space and having at least one filler means defining an opening at the atmosphere for introducing electrolyte liquid into said interior space, a fill-in chamber means located between the opening of said filler means terminating in the atmosphere and the interior space, and chamber connecting means connecting the fill-in chamber means with the interior space, said chamber connecting means including at least one opening having a narrow capillary cross-section terminating in the interior space above the intended liquid level and said fill-in chamber means having an elastic bottom wall portion defining an elongated enlargeable opening for insertion of a liquid siphon into the interior space.

20. A battery according to claim 19, wherein said elongated opening in the elastic bottom portion has a narrow capillary cross-section.

21. A battery according to claim 20, further comprising a filling venting connecting means positioned outside of said fill-in chamber means.

22. A battery according to claim 21, wherein the venting connecting means has an opening provided with a capillary configuration to prevent entrance of liquid from the atmosphere into the filling venting connecting means.

23. A battery according to claim 19, further comprising a filling venting connecting means positioned outside of said fill-in chamber means.

24. A battery according to claim 23, wherein the venting connecting means has an opening provided with a capillary configuration to prevent entrance of liquid from the atmosphere into the filling venting connecting means.

25. A battery according to claim 19, wherein said elastic bottom wall portion is integral with the rest of the fill-in chamber means.

* * * * *